Patented June 12, 1928.

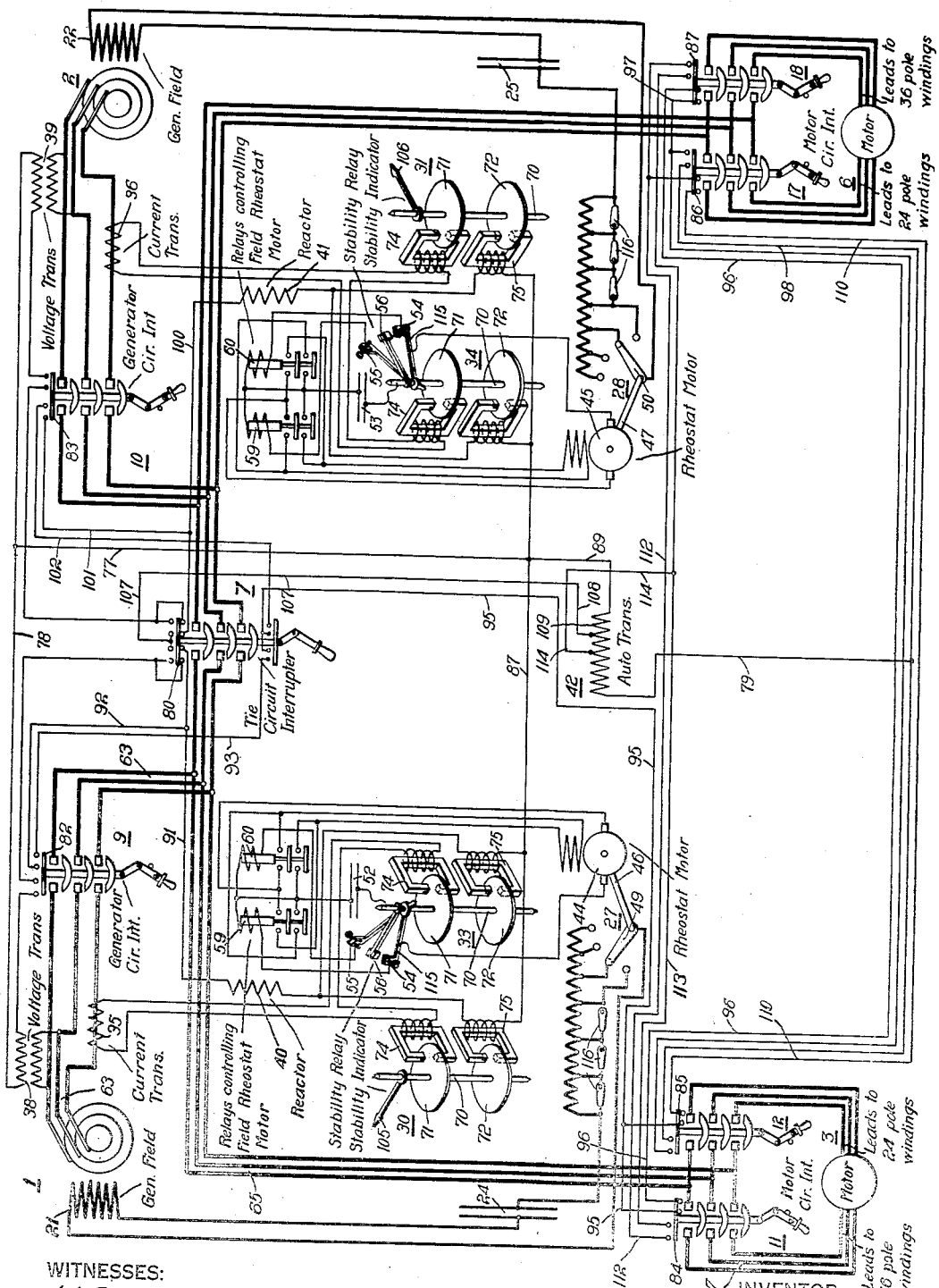

1,673,587

UNITED STATES PATENT OFFICE.

RAYMOND T. PIERCE, OF WILKINSBURG, PENNSYLVANIA, ASSIGNOR TO WESTINGHOUSE ELECTRIC & MANUFACTURING COMPANY, A CORPORATION OF PENNSYLVANIA.

STABILITY INDICATOR AND CONTROL SYSTEM.

Application filed June 30, 1921. Serial No. 481,559.

My invention relates to stability-indicator systems and particularly to means for indicating and controlling the relative stability of alternating-current generators and motors for electrically-propelled ships.

One object of my invention is to provide a system, of the above indicated character, that shall be readily adapted to single or multiphase alternating-current circuits employing a plurality of generators and motors that may selectively be connected in any of several combinations.

Another object of my invention is to provide stability-indicating and controlling means that shall be automatically adjusted or calibrated in response to each change in the number of generators and motors and also in response to each change in the number of motor-pole windings.

Another object of my invention is to provide means for automatically adjusting the excitation of alternating-current generators to stabilize the system, irrespective of which combination of generators and motors or of motor-pole windings is being employed.

In certain alternating-current systems it is necessary that the generators and motors operate in synchronous or in-step relation in order to reduce losses and to thereby render the system effective and economical.

In electric ship propulsion, such as in battleships, the variable speeds required in maneuvering the ship, require different operating relations between the generators and motors and sometimes different combinations of generators, motors and motor-pole windings.

The speed of electrically propelled battleships is controlled by changing the frequency applied to the motors, the power output of the generators and the number of poles on the motors. At each operating speed, there is a value to which the field excitation may be reduced to hold the motors in step.

A system in which a preferred embodiment of my invention may be employed comprises a plurality of generators and motors that may be operated in variously grouped combinations.

In practicing my invention, I provide means for indicating the stability of the system and for automatically controlling the excitation of the generators, irrespective of which combination of generators, motors and motor-pole windings is being employed, and means for automatically adjusting the indicating and controlling means when a change in the combination is effected.

The single figure of the accompanying drawings is a diagrammatic view of a three-phase, alternating-current system of generators and motors for the propulsion of a battleship, embodying a preferred form of my invention.

In the main circuit, the system comprises, in general, synchronous generators 1 and 2, induction motors 3 and 6, a main tie circuit interrupter or switch 7, mean generator switches 9 and 10 and motor circuit interrupters or switches 11, 12, 17 and 18.

Excitation or generator field circuits comprise field windings 21 and 22 of the generators 1 and 2, respectively, direct-current supply circuits 24 and 25 and rheostats 27 and 28.

A control or stabilizing circuit embodying my invention, comprises stability indicators 30 and 31, stability relays 33 and 34, current transformers 35 and 36, voltage transformers 38 and 39, reactors 40 and 41 and an auto transformer 42.

An auxiliary circuit, for operating and controlling the generator field circuits, comprises motors 44 and 45 connected, by shafts 46 and 47, to arms 49 and 50 of the rheostats 27 and 28, respectively. The circuits of the motors 44 and 45 are connected to direct-current circuits 52 and 53 through adjustable stationary contact members 54 and 55 and movable contact members 56 of the stability relays 33 and 34 and through relays 59 and 60 to operate the motors and to thereby adjust the rheostats 27 and 28, when the movable contact members 56 of the stability relays 33 and 34 engage the one or the other of the stationary contact members 54 and 55.

The motors 3 and 6 are each provided with sets of twenty-four and thirty-six pole windings that may selectively be connected to the generator circuits by closing the circuit interrupters 12 and 17, respectively, for twenty-four pole operation or by closing the circuit interrupters 11 and 18, respectively, for thirty-six pole operation, when the main-circuit interrupters 9 and 10 are closed.

With the circuit interrupters 9 and 11 closed and the circuit interrupters 12, 7, 10, 17 and 18 open, the generator 1 supplies current, through main supply conductors 63 and the interrupter 9, to conductor 65 and, from the latter, through the interrupter 11 and conductor 67 to the motor 3 to operate the latter with thirty-six-pole windings.

If, in the above described circuit, the interrupter 11 is open and the interrupter 12 closed, the generator 1 will be connected to the motor 3 through twenty-four-pole windings of the motor.

Similarly, the generator 2 may be connected to the motor 6 by proper operation of the interrupters 10, 17 and 18.

The main tie circuit interrupter 7 is provided to so connect the circuits of the generator 1 and the motor 6, on one side, or the generator 2 and the motor 3, on the other side, as to permit single operation of the generators with various combinations of motors and motor-pole windings.

Each of the stability indicators 30 and 31 and the stability relays 33 and 34 comprises a shaft 70 and disks 71 and 72 that, respectively, tend to turn in opposite directions under the influence of electromagnets 74 and 75. The coils of the magnets 74 of the stability devices 30 and 33 are connected in series relation to each other and to the current transformer 35. Similarly, the coils 74 of the stability devices 31 and 34 are connected in series relation to each other and to the current transformer 36.

The current coils of the electromagnets 74 are relatively independent of frequency throughout the ranges used and, therefore, affect the stability devices in accordance with the current which the generator or generators feed to the system.

The coils of the magnets 75 of the stability devices 30 and 33 are connected in parallel relation to each other and in series relation to the reactor 40 and the secondary winding of the voltage transformer 38. Similarly, the coils of the magnets 75 of the stability devices 31 and 34 are connected in parallel relation to each other and in series relation to the reactor 41 and the secondary winding of the voltage transformer 39.

Since the voltage coils of the electromagnets 75 are connected to the reactors 40 and 41 instead of the usual resistance, the currents flowing therethrough depend on the frequency of the applied voltage and are accordingly proportional to the magnetizing currents flowing through the motors. The actions of the voltage coils 75 are thus directly proportional to the magnetizing currents flowing through the motors. The position of the stability indicator or relay is accordingly determined by the action of two elements, one element, being responsive to the magnitude of the load currents and the other element being responsive to the magnitude of the magnetizing currents flowing into the motor. It is the ratio of the load currents to the magnetizing currents which determines the stability of a motor.

The auto transformer 42 is connected, through a conductor 77 and a conductor 78, to one terminal of each of the secondary windings of the voltage transformers 38 and 39 and, through a conductor 79 and auxilary switches, to be hereinafter described, to the other terminals of the secondary windings of each of the voltage transformers 38 and 39.

The generators and motors may be operatively connected in various groupings or combinations but, under normal operating conditions, there are three general combinations. One combination is to have each generator connected to one of the two motors, with the twenty-four-pole winding groups of the latter in operation. Another combination is to have either generator and the two motors, the latter being connected with twenty-four-pole windings. The third combination is to have either generator and the two motors, the latter being connected with thirty-six-pole windings.

To effect the first of the above mentioned three combinations, the circuit interrupters 9, 10, 12 and 17 must be in the upper or closed positions, in which positions auxiliary switches 82 and 83 on the circuit interrupters 9 and 10, respectively, and auxiliary switches 85 and 86 on the circuit interrupters 12 and 17, respectively, are closed, and an auxiliary switch 80 on the circuit interrupter 7 is in contact with back contacts in its open position.

With the above mentioned connections, current is supplied directly from the current transformers 35 and 36 to the current coils of the electromagnets 74 of each of the stability devices 30, 31, 33 and 34. Also, the voltage coils of all the electromagnets 75 are each connected, at one terminal, through a conductor 87, the conductor 77 and the conductor 78, to the voltage transformers 38 and 39 and, through a conductor 89, to one terminal of the auto transformer 42.

The other terminals of the voltage coils of the stability devices 30 and 33 are connected to the opposite terminal of the transformer 38 through the reactor 40, a conductor 91, the auxiliary switch 80, in its open position, the auxiliary switch 82, in its closed position, and hence to the transformer 38.

Similarly, the other terminals of the voltage coils of the stability devices 31 and 34 are connected through the reactor 41, a conductor 100, the auxiliary switch 80, in its open position, the auxiliary switch 83, in its closed position, to the transformer 39. Thus, the voltage coils of one set of the electromagnets 75 are supplied with current proportional to the potential difference between the terminals of the transformer 38, and the other set of the electromagnets 75 are supplied with current proportional to the potential difference between the terminals of the transformer 39.

If the field excitation is reduced, the generator voltage is reduced and the voltage elements of the stability devices 30, 31, 33 and 34 are energized to a less degree. At the same time, the current which the generators feed to the system increases.

Under the above specified conditions, pointers 105 and 106 on the shafts 70 of the stability indicators 30 and 31 each point to that portion of a scale (not shown) which shows that the decrease in excitation is approaching an unsafe operating condition. At the same time, the movable contact members 56 of the stability relays 33 and 34 are actuated to engage one of the stationary contact members 54 or 55, to complete a circuit across the direct-current supply circuits 52 and 53 and through the coils of the relays 59 or 60. When thus energized, the relays 59 or 60 complete circuits between the supply circuits 52 and 53 and the rheostat motors 27 and 28, respectively. When the motors 27 and 28 are thus energized, they operate the rheostat arms 49 and 50 to vary the current supplied by direct-current circuits 24 and 25, respectively, to the field windings 21 and 22 of the generators 1 and 2. In this instance, the variation is in a direction to increase the excitation of the generators and to thereby bring the motors 3 and 6 to a safe operating condition.

If, under normal operating conditions, the excitation of the generators becomes higher, the line current becomes lower, thus causing the voltage elements of the stability devices to have greater effect than the current elements. Under this condition, the above described sequence of operation will be reversed. That is, the pointers 105 and 106 will indicate that the increase in excitation is becoming excessive and the movable contact members 56 will be so moved as to cause the rheostat motors to operate in the reverse direction to insert resistance in the generator field circuits.

The above described operation is substantially the same, irrespective of which combination of generators and motors is employed, with the exception of the voltage supplied to the electromagnets 75.

Assuming one of the second above mentioned normal operating combination of generators and motors, that is, with the generator 1 operating alone in connection with both motors and twenty-four-pole windings, the voltage elements of the stability devices 30 and 33 will be connected between the terminals 79 and 89 of the auto transformer 42, as follows: an end section 109 of the auto transformer is close circuited through the conductor 89, the conductor 77, the conductor 78, the voltage transformer 38, the auxiliary switch 82, the auxiliary switch 80 and a conductor 107 to the tap 108. One terminal of the voltage elements 75 is connected to this closed circuit through the conductor 87. Since the generator interrupter 10 is open, the voltage elements of the stability devices 31 and 34 on the side of the generators 2 are open circuited. Starting then from the reactor 40, the circuit of the voltage elements 75 on the side of the generator 1 is completed through the conductor 91, the conductor 92, the auxiliary switch 82, the conductor 93, an auxiliary switch 81, carried by the circuit interrupter 7, the conductor 95, an auxiliary switch 84 which closes two back contacts when the circuit interrupter 11 is open, a conductor 96, an auxiliary switch 87 which closes two back contacts when the circuit interrupter 18 is open, a conductor 97, the auxiliary switches 85 and 86, and the conductor 79.

With one of the third above mentioned normal operating combinations of generators and motors, that is, with the generator 1 operating alone in connection with both motors and thirty-six-pole windings, the voltage elements of the stability devices 30 and 33 will be connected, at one terminal through the conductor 91, the conductor 92, the auxiliary switch 82, the conductor 93, the auxiliary switch 81, the conductor 95, the auxiliary switch 85, a conductor 110, the auxiliary switch 86, a conductor 112, the auxiliary switches 84 and 87 and a conductor 113 to a tap or conductor 114 connected to an intermediate point on the auto transformer 42.

The stability relays 33 and 34 are each further adjustable by having the stationary contact members 54 and 55 thereof mounted on a double armed bracket or structure 115 that may be loosely mounted on the shaft 70 or otherwise arranged to be turnable about an axis coincident with the axis of the shaft 70.

Also, the rheostats 27 and 28 may be provided with means, such as switches 116, for manually adjusting the field circuits of the generators.

The pointers 105 and 106 of the stability indicators 30 and 31 are adapted to move substantially three hundred degrees and to be normally held in a center or zero position by a suitable spring (not shown).

The indicators 30 and 31 may also be provided with a scale (not shown) divided into zones of different colors, one indicating dangerous operations or low excitation, another indicating safe operation and another indicating excessive excitation.

The stability devices operate on the induction principle and the structure is light and very rugged so that there is no danger of damaging the instrument under starting conditions or during manipulation when the current values are likely to be high.

By my invention, irrespective of which combination of generators or motors is in service, the stability indicators 30 and 31 will always indicate to the operators the correct value of field excitation on the generator for stable operation and the stability relays 33 and 34 will be automatically actuated to adjust the generator field excitation accordingly.

While I have shown and described a particular form of my invention, changes may be effected therein without departing from the spirit and scope thereof, as set forth in the appended claims.

I claim as my invention:

1. In an alternating-current system, the combination with energizing means and translating means having various operating relations thereto, of means adjustable in accordance with any of said relations for indicating the relative stability between the energizing means and the translating means.

2. In an alternating-current system, the combination with energizing means and a selective number of motor windings, of stability means comprising co-operating current and voltage actuating windings, and means for varying the effective ampere turns of one of said windings in accordance with the number of windings selected.

3. The combination with a variable-voltage alternating-current supply system, of one or more motors, means for energizing the motors in any one of several combinations of connections for operating under different speed and power conditions, a stability device having an actuating element responsive to a load-current component and another actuating element responsive to a reactive-current component, and means dependent upon the said combinations of motor connections for varying the responsiveness of said stability device.

4. The combination with a variable-voltage alternating-current supply system, of one or more motors, means for energizing the motors in any one of several combinations of connections for operating under different speed and power conditions, a stability device having an actuating element responsive to a load-current component and another actuating element responsive to a reactive-current component, means dependent upon the said combinations of motor connections for varying the responsiveness of said stability device, and means responsive to said stability device for automatically varying the voltage of said supply system to limit the maximum and minimum values of voltage permissible under any operating conditions.

5. The combination with a variable-voltage alternating-current supply system comprising a pair of generators adapted to operate jointly or individually, a pair of energy-utilizing motor-machines each adapted to operate at speeds corresponding to any one of a plurality of pole numbers, means for energizing said motor-machines with any one of said pole-number connections and from either one or both of said generators, a stability device having an actuating element responsive to a load-current component and another actuating element responsive to a reactive-current component, and means dependent upon the said combinations of motor connections for varying the responsiveness of said stability device.

6. The combination with a variable-voltage alternating-current supply system comprising a pair of generators adapted to operate jointly or individually, a pair of energy-utilizing motor-machines each adapted to operate at speeds corresponding to any one of a plurality of pole numbers, means for energizing said motor-machines with any one of said pole-number connections and from either one or both of said generators, a stability device having an actuating element responsive to a load-current component and another actuating element responsive to a reactive-current component, and means responsive to said stability device for automatically varying the voltage of said supply system to limit the maximum and minimum values of voltage permissible under any operating conditions.

In testimony whereof, I have hereunto subscribed my name this 24th day of June, 1921.

RAYMOND T. PIERCE.